(12) United States Patent
Branover et al.

(10) Patent No.: US 11,586,472 B2
(45) Date of Patent: Feb. 21, 2023

(54) METHOD OF TASK TRANSITION BETWEEN HETEROGENOUS PROCESSORS

(71) Applicant: Advanced Micro Devices, Inc., Santa Clara, CA (US)

(72) Inventors: Alexander J. Branover, Boxborough, MA (US); Benjamin Tsien, Santa Clara, CA (US); Elliot H. Mednick, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/709,404

(22) Filed: Dec. 10, 2019

(65) Prior Publication Data

US 2021/0173715 A1 Jun. 10, 2021

(51) Int. Cl.
*G06F 9/50* (2006.01)
*G06F 11/30* (2006.01)

(52) U.S. Cl.
CPC .......... *G06F 9/5044* (2013.01); *G06F 9/5094* (2013.01); *G06F 11/3024* (2013.01); *G06F 11/3062* (2013.01); *G06F 2209/501* (2013.01); *G06F 2209/508* (2013.01)

(58) Field of Classification Search
CPC .. G06F 9/5044; G06F 9/5094; G06F 11/3062; G06F 11/3024; G06F 2209/508; G06F 2209/501; G06F 2209/5022; G06F 9/5088; G06F 9/4856; G06F 1/3293
See application file for complete search history.

(56) References Cited

U.S. PATENT DOCUMENTS

| | | | |
|---|---|---|---|
| 2006/0167575 A1* | 7/2006 | Chin | G11B 27/034 700/94 |
| 2012/0324250 A1 | 12/2012 | Chakraborty et al. | |
| 2013/0057563 A1* | 3/2013 | Persson | G06F 9/485 345/522 |
| 2014/0196050 A1 | 7/2014 | Yu et al. | |
| 2015/0286262 A1* | 10/2015 | Park | G06F 11/3058 713/320 |
| 2016/0048199 A1* | 2/2016 | Kuroda | G06F 1/3287 713/323 |
| 2016/0140070 A1* | 5/2016 | Araujo | G06F 9/542 710/310 |
| 2017/0177407 A1 | 6/2017 | Therien et al. | |
| 2017/0255496 A1* | 9/2017 | Deng | G06F 9/4881 |
| 2018/0275893 A1 | 9/2018 | Nguyen et al. | |
| 2018/0365425 A1* | 12/2018 | Packer Ali | G06F 21/575 |
| 2020/0142754 A1* | 5/2020 | Park | G06F 9/4856 |

OTHER PUBLICATIONS

Branover, A., et. al., U.S. Appl. No. 16/454,013, filed Jun. 26, 2019, "Method and Apparatus for Servicing an Interrupt."

* cited by examiner

*Primary Examiner* — Sisley N Kim
(74) *Attorney, Agent, or Firm* — Volpe Koenig (57) ABSTRACT

A method, system, and apparatus determines that one or more tasks should be relocated from a first processor to a second processor by comparing performance metrics to associated thresholds or by using other indications. To relocate the one or more tasks from the first processor to the second processor, the first processor is stalled and state information from the first processor is copied to the second processor. The second processor uses the state information and then services incoming tasks instead of the first processor.

20 Claims, 7 Drawing Sheets

METHOD OF TASK TRANSITION BETWEEN HETEROGENOUS PROCESSORS

BACKGROUND

Conventional computer systems rely on operating system-level and other higher-level software decisions to move tasks between different processors within a system. These conventional solutions are associated with substantial overhead in terms of performance inefficiencies and additional power consumption. By moving tasks among different processors using finer-grained tracking and decision making, performance per power consumed is optimized.

BRIEF DESCRIPTION OF THE DRAWINGS

A more detailed understanding can be had from the following description, given by way of example in conjunction with the accompanying drawings wherein.

DETAILED DESCRIPTION

As described in further detail below, performance-per-watt optimizations during runtime on a fine-grained scale are achieved by timely moving tasks between different processors. In one example, a first processor is a relatively less-powerful and more power-efficient processor and a second processor is a relatively more-powerful and less power-efficient processor. Additionally or alternatively, the relatively less-powerful processor may be considered a less-power consuming processor and the relatively more-powerful processor may be considered a more-power consuming processor. In another example, the first processor and second processor are heterogeneous, i.e. a central processing unit (CPU) and a graphics processing unit (GPU). By identifying applicable conditions and relocating a task from a suboptimal processor to a more optimal processor, performance per amount of power used is improved and overall processing performance is enhanced.

In one example, a method for relocating a computer-implemented task from a relatively less-powerful processor to a relatively more-powerful processor includes monitoring one or more metrics associated with execution of the task by the relatively less-powerful processor. The method further includes comparing at least one metric of the one or more metrics to a threshold. The method further includes selectively relocating the task to the relatively more-powerful processor and executing the task on the relatively more-powerful processor based on the comparing.

In another example, the at least one metric includes a core utilization metric of the relatively less-powerful processor. In another example, the core utilization metric includes an indication of a duration of time that the less-powerful processor is running at maximal speed and the threshold is an indication of a duration of time threshold, The task is relocated to the relatively more-powerful processor on a condition that the indication of the duration of time that the less-powerful processor is running at maximal speed is greater than the duration of time threshold.

In another example, the at least one metric includes a memory utilization metric associated with the relatively less-powerful processor. In another example, the memory utilization metric includes an indication of a duration of time that a memory is operating at a maximal memory performance state and the threshold is an indication of a duration of time threshold. The task is relocated to the relatively more-powerful processor on a condition that the indication of the duration of time that the less-powerful powerful processor is running at maximal speed is greater than the duration of time threshold.

In another example, the at least one metric of the one or more metrics includes a direct memory access (DMA) data rate.

In another example, a method for relocating a computer-implemented task from a relatively more-powerful processor to a relatively less-powerful processor includes monitoring one or more metrics associated with execution of the task by the relatively more-powerful processor. The method further includes comparing at least one metric of the one or more metrics to a threshold and selectively relocating the task to the relatively less-powerful processor and executing the task on the relatively less-powerful processor based on the comparing.

In another example, the at least one metric includes an indication of a duration of time during which a single core of the relatively more-powerful processor is used and the threshold is an indication of a duration of time threshold. The task is relocated to the relatively less-powerful processor on a condition that the indication of the duration of time during which the single core of the relatively more-powerful processor is used is less than the duration of time threshold.

In another example, the at least one metric includes a core utilization metric of the relatively more-powerful processor. The core utilization metric of the relatively more-powerful processor includes an average utilization over an interval of time and the threshold is an indication of a utilization threshold. The task is relocated to the relatively less-powerful processor on a condition that the average utilization over an interval of time is less than the utilization threshold.

In another example, the core utilization metric of the relatively more-powerful processor includes an idle state average residency and the threshold is an indication of an idle state threshold, the task is relocated to the relatively less-powerful processor on a condition that the idle state average residency is greater than the idle state threshold.

In another example, the at least one metric includes a memory utilization metric associated with the relatively less-powerful processor and the threshold is a memory utilization threshold. The task is relocated to the relatively less-powerful processor on a condition that the memory utilization metric is less than the memory utilization threshold.

In another example a method of task relocation from a first processor to a second processor includes placing the first processor into an idle state or a stalled state. The method further includes saving the architecture state of the first processor in a first memory location and copying the architecture state to a second memory location. The method further includes redirecting an interrupt to the second processor and restoring, by the second processor, the architecture state from the second memory location. The method further includes fetching, by the second processor, an interrupt service routine (ISR) address, servicing, by the second processor, the ISR using the ISR address, and executing one or more subsequent tasks by the second processor while the first processor remains in the idle state or the stalled state.

In another example, the first memory location is associated with the first processor and the second memory location is associated with the second processor. In another example, the architecture state includes one or more register settings and one or more flag settings. In another example, the method further includes adjusting the architecture state. In another example, an incoming interrupt for the first processor is stalled until after the architecture state is copied to the second memory location so that the interrupt can be redirected to the second processor.

In another example, the ISR address is fetched from a local advanced programming interrupt controller (LAPIC).

In another example, the first processor is a relatively more-powerful processor and the second processor is a relatively less-powerful processor. The method further includes determining that the relatively more-powerful processor is under-utilized and relocating one or more tasks to the second processor based on the determining.

In another example, the first processor is a relatively less-powerful processor and the second processor is a relatively more-powerful processor. The method further includes determining that the relatively less-powerful processor is over-utilized and relocating one or more tasks to the second processor based on the determining.

Figure 1:
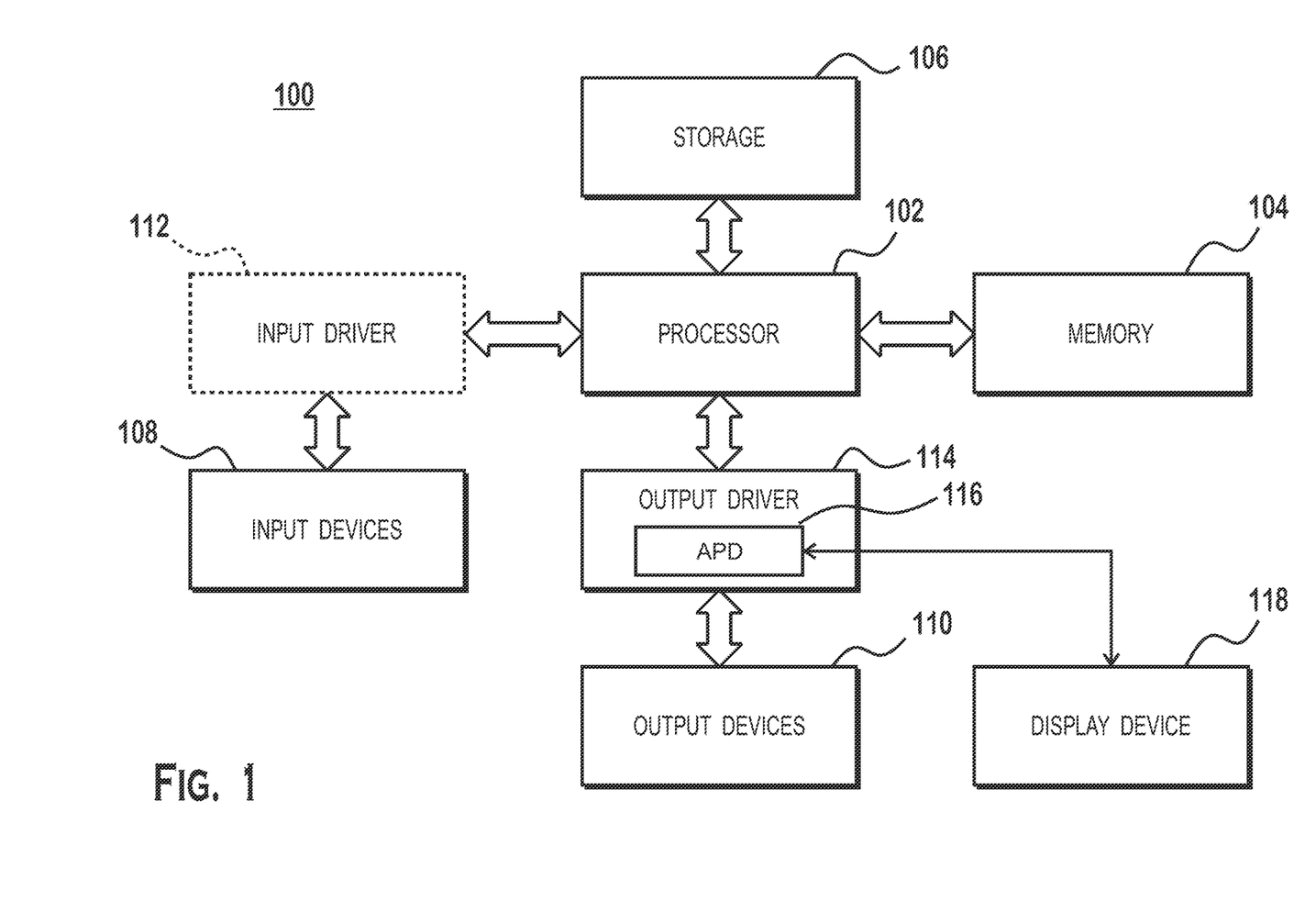
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
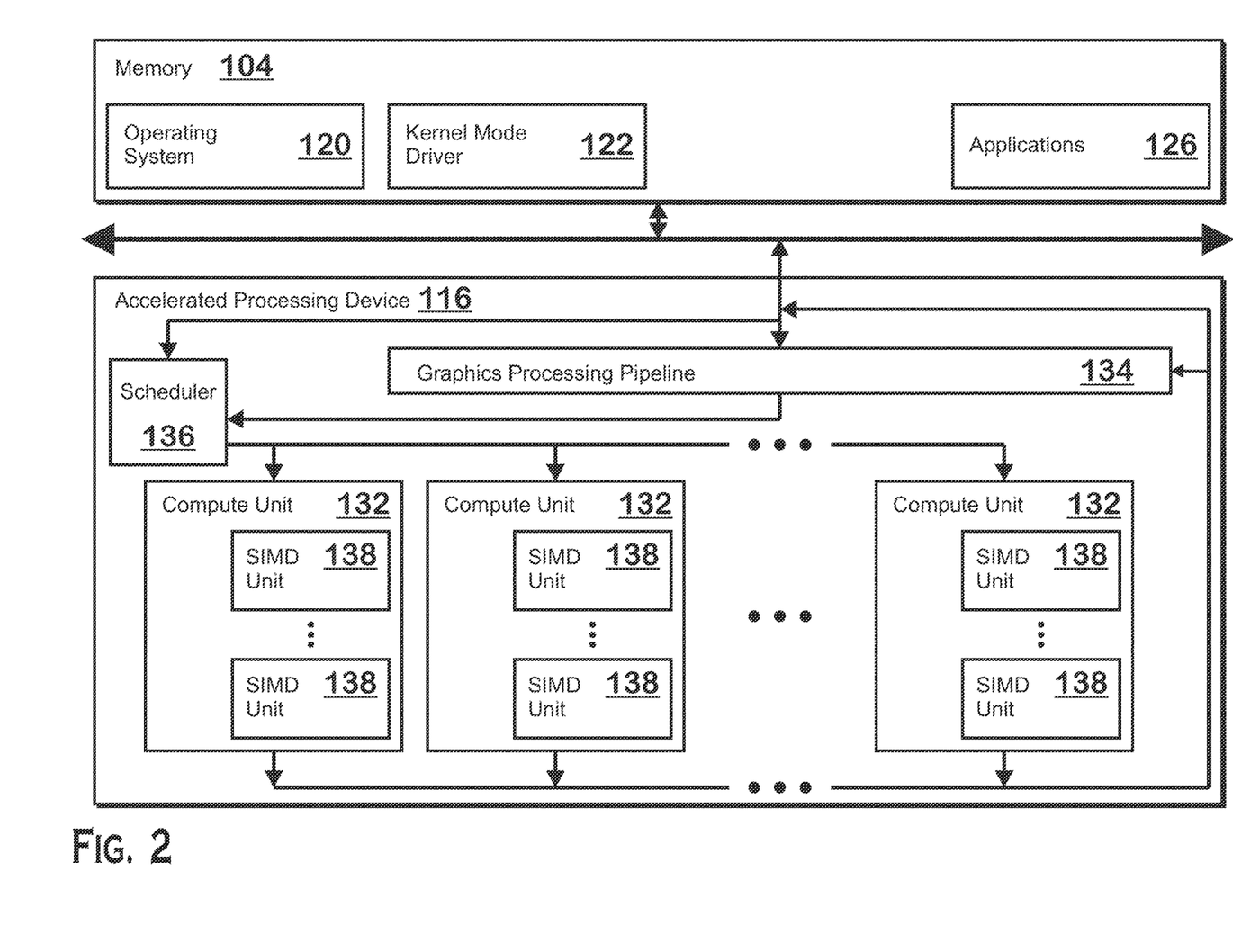
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
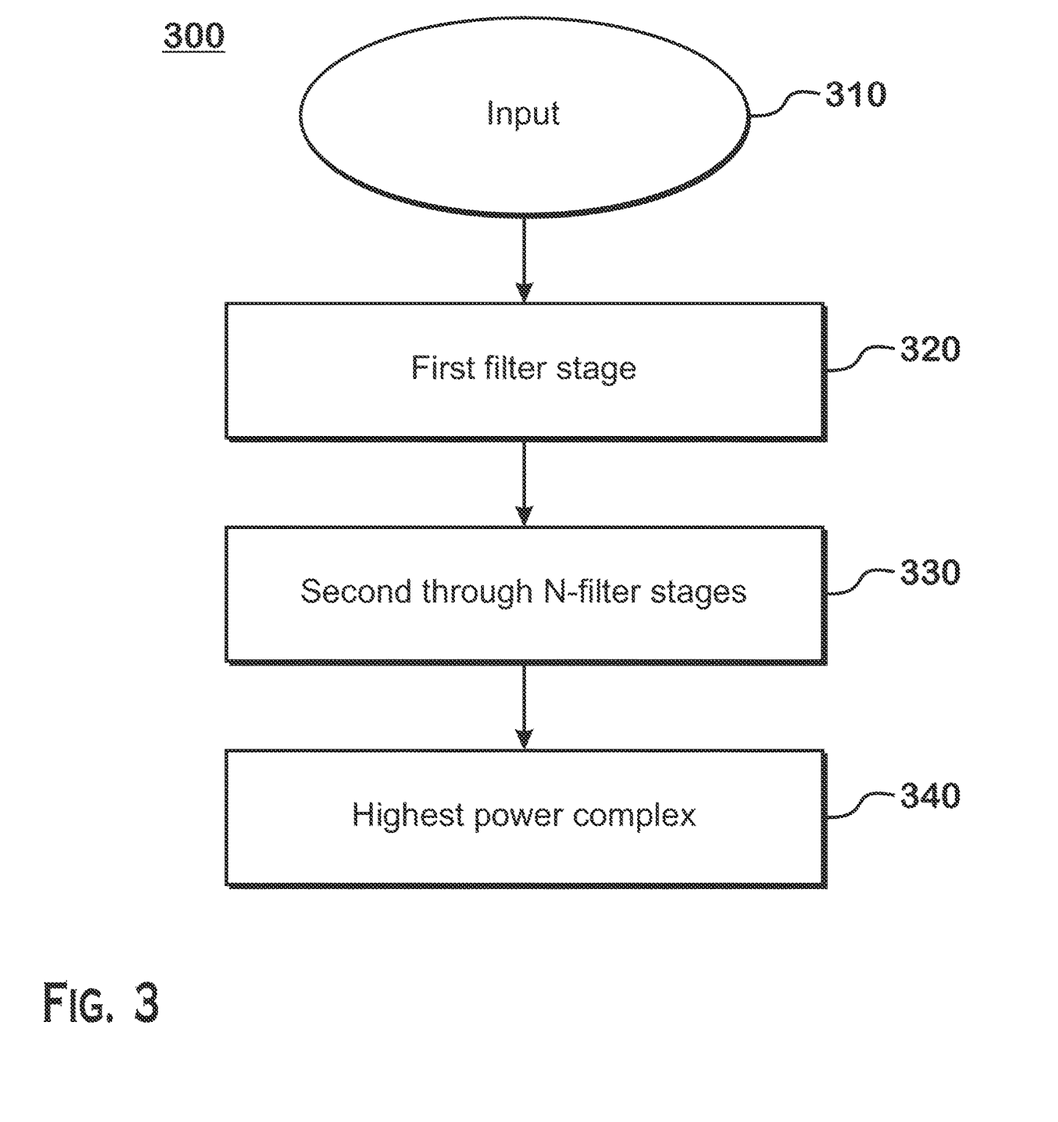
FIG. 3 is a block diagram depicting an example of a system for efficiently servicing input tasks.

FIG. 3 is a block diagram depicting an example of a system 300 for efficiently servicing input tasks. Input 310 represents one or more tasks, e.g. interrupts, that require servicing. To efficiently service a task, it is optimal to involve only those resources that are necessary to reduce the amount of power consumed. As depicted in FIG. 3, input 310 is fed into a first filter stage 320. First filter stage 320 is an initial service stage, for example a general purpose input/output (GPIO) stage. In this example, the GPIO stage may not support an x86 instruction set. On a condition that the input 310 can be serviced by the GPIO stage, all remaining filter stages as shown in 330 and the highest power complex 340 remain powered off or in a low-power state. In one example, an interrupt does not require use of x86 instructions. As such, only the GPIO needs to be powered-up to service the interrupt and the remaining components of the system 300 remain idle. In this scenario, keeping the subsequent filter stages and highest power complex in a low power or powered off state improves performance efficiency by avoiding unnecessary power consumption.

In the event that the input 310 cannot be serviced by the first filter stage 320, the input 310 is passed to a subsequent filter stage, such as a second filter stage 330 as depicted in FIG. 3. In one example, the second filter stage is a little or tiny processor. In this example, the little or tiny processor uses an x86 instruction set. This little or tiny processor, for example, can service interrupt service routine (ISR) tasks that require x86 instructions, can execute restore tasks such as restoration of an architecture state associated with device configuration registers, restoration of a micro-architectural state required for a device to resume its execution, or operating system execution, and can execute general purpose low instructions per cycle (IPC) tasks. In another example, the little or tiny processor can warm up a last level cache. In this example, the little or tiny processor fetches code and/or data into a shared cache between the little or tiny processor and the big processors so that when execution switches to the big processor, demand misses are avoided. On the condition that the ISR is passed to the little or tiny processor, the GPIO stage is placed into an idle, stalled, or powered down state. The little or tiny processor is a less-powerful processor than, for example, a more-powerful processor, e.g. a big core, from the highest power complex 340. In one example, the operating system or kernel is unaware of the little or tiny processor. For example, similar to that described above with respect to first filter stage 320, any subsequent filter stages and the highest power complex 340 remain in a low power or powered off state, thus reducing power consumption and improving performance per unit of power used.

As depicted in the example in FIG. 3, system 300 includes second through N-filter stages 330, wherein N is any integer greater than or equal to 2. As such, similar to as described above, an input 310 is passed through filter stages until a suitable filter stage can service the input 310. Again, this hierarchy of filter stages enables subsequent filter stages and the highest power complex 340 to remain in a low power or powered off state. Furthermore, once a filter stage is determined as being appropriate for servicing a task, the prior and subsequent stages are placed in an idle, stalled, powered-off, or the like state. Although FIG. 3 depicts a first filter stage 320 and second through N-filter stages 330, any number of filter stages including no filter stages may be implemented. Additionally or alternatively, each filter stage can be a different core of a multicore complex.

As depicted in the example in FIG. 3, the highest power complex 340 services the input 340 if none of the prior filter stages are appropriate. In one example, highest power complex 340 is one or more big central processing unit (CPU) cores that are relatively more-powerful than, for example, the little or tiny processor. In one example, the highest power complex 340 is a complex of CPU cores that are used to service longer tasks and higher IPC tasks. Thus, in the event input 310 is a longer or higher IPC task, the input 310 is passed down to the highest power complex 340 for servicing and filter stage 320 as well as second through N-filter stages are placed in a powered-down, low power, stalled, or the like state.

Figure 4:
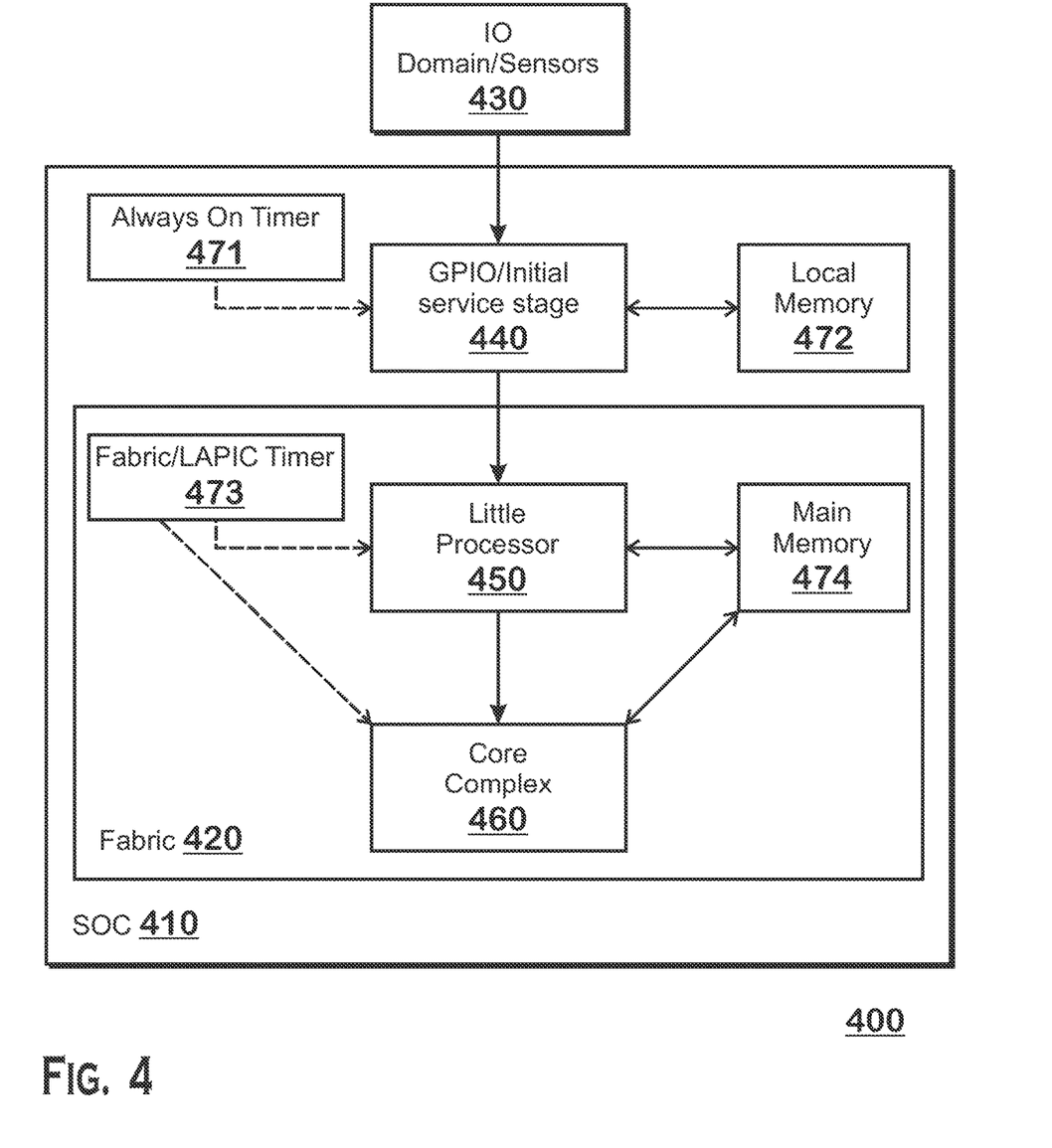
FIG. 4 is a block diagram depicting another example of a system for efficiently servicing input tasks.

FIG. 4 is a block diagram depicting another example of a system 400 for efficiently servicing input tasks. Input/output (IO) Domain/Sensors 430 provide one or more input signals to GPIO/Initial service stage 440. In one example, IO Domain/Sensors 430 provide any form of signal or task, or provide a signal that is associated with a task that should be serviced by one or more components included in system on a chip (SOC) 410. In one example, GPIO/Initial service stage 440 as depicted in FIG. 4 does not support an x86 instruction set. On a condition that the input from IO Domain/Sensors 430 can be serviced by the GPIO/Initial service stage 440, the fabric 420 including little processor 450, core complex 460, fabric/local advanced programming interrupt controller (LAPIC) timer 473, and main memory 474 remain powered off or in a low-power state. For example, an interrupt does not require use of x86 instructions and the GPIO/Initial service stage 440 services the interrupt while the fabric 420 and the components included therein remain powered off or in a low power state. The GPIO/Initial service stage 440 also receives input from the always on timer 471 and interfaces with local memory 472. The GPIO/Initial service stage 440 can be, for example, a small Advanced reduced instruction set computer (RISC) machine (ARM™) core, a small microcontroller, a micro sequencer, a small hardware machine, or other low-power consumption device that may also be high in performance efficiency. When the GPIO/Initial service stage 440 is able to service the incoming task/interrupt and the fabric 420 and the components included therein remain powered off or in a low power state, performance efficiency is improved by avoiding unnecessary power consumption.

As depicted in the example in FIG. 4, system 400 includes a fabric 420, which includes, among other things, a little/tiny processor 450. In one example, the little/tiny processor 450 is relatively more-powerful than the GPIO/Initial service stage 440. In the event that the task or interrupt from IO Domain/Sensor 430 cannot be serviced by the GPIO/Initial service stage 440, the little/tiny processor 450 is woken up and the task or interrupt is passed to the little/tiny processor 450. The little/tiny processor 450 can be, for example, one core of a larger core complex, such as the core complex 460. In another example, the little/tiny processor 450 could also be a separate on-die microcontroller. In one example, the little/tiny processor uses an x86 instruction set. In this example, the little/tiny processor services ISR tasks that require x86 instructions, executes restore tasks, and executes low instructions per cycle (IPC) tasks. In one example, the little/tiny processor 450 is a less-powerful processor than, for example, a more-powerful processor from core complex 460. In another example, the operating system or kernel is unaware of the little/tiny processor 450. The little/tiny processor 450 receives input from a fabric/LAPIC timer 473 and the little/tiny processor 450 also interfaces with main memory 474. When the little/tiny processor 450 services, for example, an interrupt, the fabric 420 is powered up but the core complex 460 remains in an off state or low power state, thus reducing power consumption and improving performance per power used.

As depicted in the example in FIG. 4, the core complex 460 services, for example, an interrupt if the GPIO/Initial service stage 440 and the little/tiny processor 450 are not capable of doing so. In one example, the core complex 460 is one or more central processing unit (CPU) cores that are relatively more-powerful and/or relatively more power-consuming than, for example, the little or tiny processor. The one or more CPU cores of core complex 460 may be considered "big" cores. In one example, core complex 460 is a complex of CPU cores that are used to service longer tasks and higher IPC tasks. Thus, on the condition an input task is a longer or higher IPC task, such as an OS task, the core complex 460 is woken up to service the input task.

Figure 5:
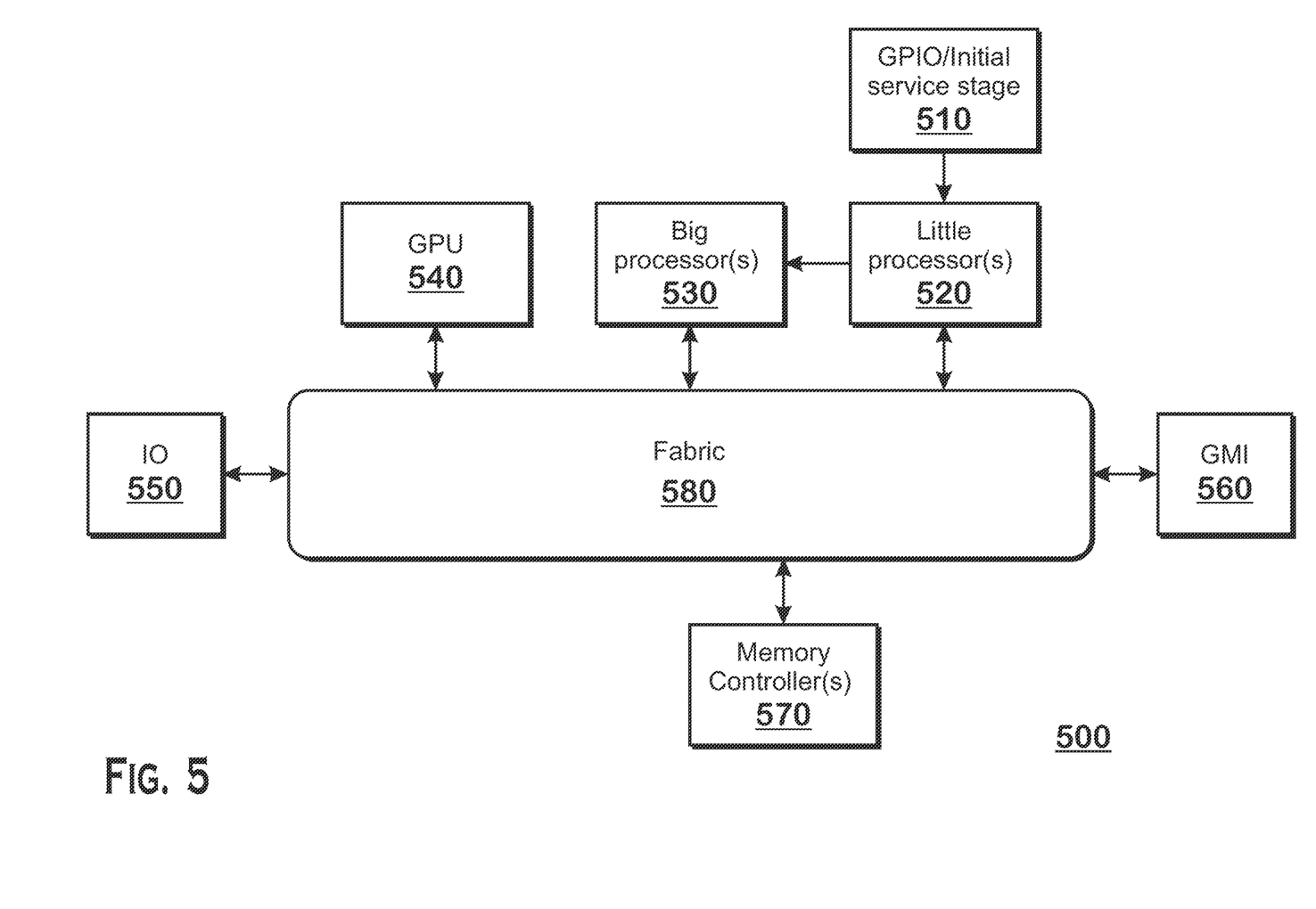
FIG. 5 is a block diagram depicting another example of a system for efficiently servicing input tasks.

FIG. 5 is a block diagram depicting another example of a system 500 for efficiently servicing input tasks. System 500 includes, for example, a GPIO/Initial service stage 510 that receives a task or interrupt. The GPIO/Initial service stage 510 is coupled to one or more little/tiny processors 520. On a condition the GPIO/Initial service state 510 is unable to service the received task or interrupt, the one or more little processors 520 are woken up along with the fabric 580. The one or more little/tiny processors 520, one or more big processors 530, GPU 540, IO 550, global memory interconnect (GMI) 560, and one or more memory controllers 570 are coupled to the fabric 580. In one example, the fabric includes a transport layer and a plurality of bridges to connect the one or more little/tiny processors 520, the one or more big processors 530, the GPU 540, the IO 550, the GMI 560, and the one or more memory controllers 570 to the transport layer.

On a condition that the one or more little/tiny processors 520 cannot service the received task or interrupt, the one or more big processors 530 along with the fabric 580 are woken up to service the task or interrupt.

Figure 6:
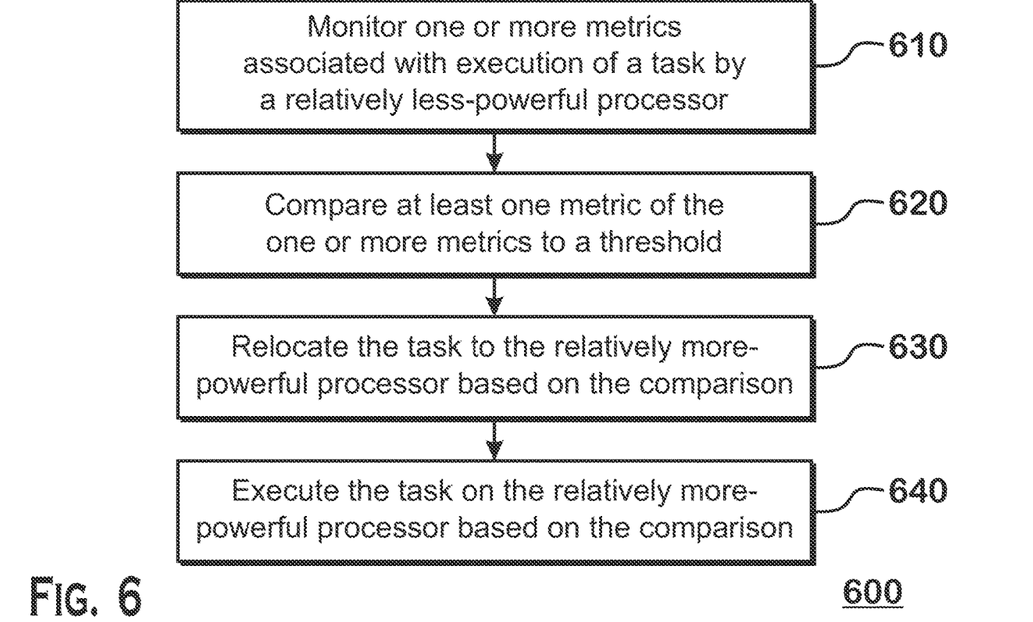
FIG. 6 is a flow chart depicting an example method of relocating a task from a first processor to a second processor.

FIG. 6 is a flow chart depicting an example method 600 of relocating a task from a first processor to a second processor. In one example, the first processor is a relatively less-powerful processor and the second processor is a relatively more-powerful processor. Method 600 includes, at step 610, monitoring one or more metrics associated with execution of the task by the relatively less-powerful processor.

The one or more metrics include, for example, a core utilization metric of the relatively less-powerful processor. In one example, the core utilization metric is a measure of how much the relatively less-powerful and/or relatively less-power consuming processor is running at a maximal speed. This measure can, for example, indicate a percentage of time over some period that the relatively less-powerful and/or relatively less-power consuming processor operates at or near the maximal speed. In another example, the core utilization metric is a percentage of time over a time interval that the core residency of the relatively less-powerful and/or less-power consuming processor is in an active state. The one or more metrics can also include, for example, a memory utilization metric. In one example, the memory utilization metric is a measure of how much the memory is used by the relatively less-powerful processor. This measure, in one example, indicates a percentage of time over some period that the memory is operating in a maximal performance state, sometimes referred to as a p-state. The one or more metrics can also include, for example, a direct memory access (DMA) progress indication. In one example, the DMA progress indication is a data rate over some period of time. In yet another example, the one or more metrics can include an interrupt arrival rate and/or a count of pending interrupts. In this example, a large number of each indicates urgency to switch from smaller or fewer intermediate processors to bigger and/or more numerous highest power complexes.

As shown in FIG. 6, the method 600 further includes, at step 620, comparing at least one metric of the one or more metrics to a threshold. In the example wherein the one or more metrics includes a core utilization metric, the core utilization metric, or more specifically the indication of the relatively less-powerful processor operating at a maximal speed, is compared to a core utilization metric. For example, the relatively less-powerful processor is operating at maximal speed 50% of the time and the threshold is 40%. In another example, the one or more metrics include a memory utilization metric and the threshold is a memory utilization threshold. In this example, the memory is in a maximal performance state 70% of the time and the memory utilization threshold is 80%. In yet another example, the one or more utilization metrics include a DMA data rate indication and the threshold is a data rate threshold. For example, the DMA data rate indication indicates 10 megabytes per second and the threshold is 12 megabytes per second.

As shown in FIG. 6, the method 600 further includes, at step 630, relocating the task to the relatively more-powerful processor based on the comparison performed in step 620. In one example, on a condition that a core utilization metric is greater than its associated threshold, the system determines that the relatively less-powerful processor is over-utilized and relocates the task to the relatively more-powerful processor. On a condition that the core utilization metric is below the threshold, the task is not relocated. In another example, on a condition that a memory utilization metric is greater than its associated threshold, the system determines that the relatively less-powerful processor is over-utilized and relocates the task to the relatively more-powerful processor. On a condition that the memory utilization metric is below the threshold, the task is not relocated. In yet another example, on a condition that a DMA progress rate is below its associated threshold, the system determines that the relatively less-powerful processor is over-utilized and unable to make sufficient progress in processing the task. As such, the task is relocated to the relatively more-powerful processor. On a condition that the DMA progress rate is above its associated threshold, the task is not relocated.

As shown in FIG. 6, the method 600 further includes, at step 640, executing the task on the relatively more-powerful processor based on the comparison. It logically follows that the task will be executed on the processor where it is located. As such, if the task is relocated to the relatively more-powerful processor, the relatively more-powerful processor executes of the task. Additionally, the relatively less-powerful task is powered down or otherwise placed in a low-power state. If the task is not relocated, the task remains on the relatively less-powerful processor and is executed by the relatively less-powerful processor.

A task can be moved to the relatively more-powerful processor from the relatively less-powerful processor based on other indications in addition to those disclosed above. In one example, an ISR returns control to the OS. In this example, it is less preferable to execute the OS on the relatively less-powerful processor. As such, execution of OS tasks are transitioned to the relatively more-powerful processor. Additionally, the relatively less-powerful processor is powered down or otherwise placed in a low-power state. In another example, a machine check architecture (MCA) event requires a software stack that is better suited to be run on the relatively more-powerful processor. An MCA event can include, for example, a transaction error, a data error, or a parity error. In another example, any event that involves system-level management that requires the OS is moved to the relatively more-powerful processor for execution. Again, the relatively less-powerful processor is powered down or otherwise placed in a low-power state.

Figure 7:
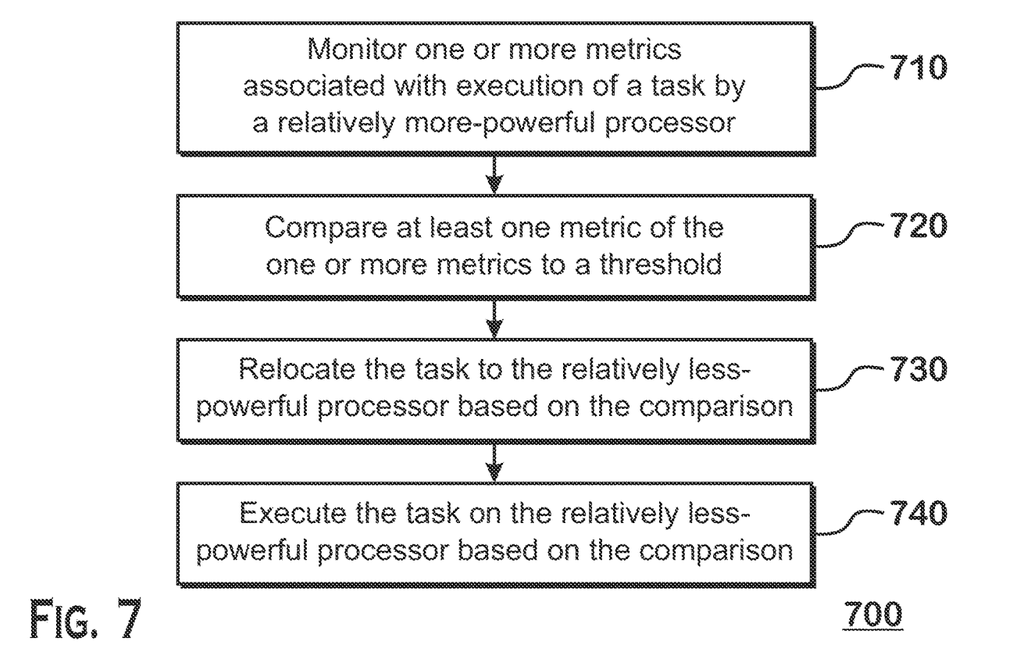
FIG. 7 is a flow chart depicting another example method of relocating a task from a first processor to a second processor.

FIG. 7 is a flow chart depicting another example method 700 of relocating a task from a first processor to a second processor. In one example, the first processor is a relatively more-powerful processor and the second processor is a relatively less-powerful processor. Method 700 includes, at step 710, monitoring one or more metrics associated with execution of the task by the relatively more-powerful processor.

The one or more metrics can include, for example, a core utilization metric, a memory utilization metric, or a DMA progress metric such as those described above with respect to FIG. 6. The one or more metrics can also include, for example, an indication of how much a single relatively more-powerful core is used for some duration. For example, a system includes multiple relatively more-powerful processor cores, which can be equivalently viewed each as relatively more-powerful processors. In one example, a measure of utilization of only one of the cores of the multiple cores is tracked. In this example, this measure is not specific to the same, single core, but rather tracks utilization of a single core at a time, wherein the particular core in use can change. For the example wherein the one or more metrics includes a core utilization metric, the core utilization metric can indicate the average idle state residency of the relatively more-powerful processor. For example, the average idle state residency indicates how often the relatively more-powerful processor is in a particular idle state, e.g. a c-state, over some interval of time, or indicates an average idle state, e.g. c-state, in which the relatively more-powerful processor resides over the interval of time. One should recognize that a c-state is an advanced configuration and power interface (ACPI) idle state.

As shown in FIG. 7, the method 700 further includes, at step 720, comparing at least one metric of the one or more metrics to a threshold. In the example wherein the one or more metrics includes an indication of how much a single relatively-more powerful core is used for some duration, on a condition that a single core is used more than a threshold percentage, the system decides that the relatively more-powerful processor is not necessary and relocates the task to the relatively less-powerful processor and powers down the relatively more-powerful processor.

As shown in FIG. 7, the method 700 further includes, at step 730, relocating the task to the relatively less-powerful processor based on the comparison performed in step 720. In one example, on a condition that the relatively more-powerful processor is idle on average 70% of the time, and the threshold is 50% of the time, then the task is relocated to the relatively less-powerful processor.

As shown in FIG. 7, the method 700 further includes, at step 740, executing the task on the relatively less-powerful processor based on the comparison. It logically follows that the task will be executed on the processor where it is located. As such, if the task is relocated to the relatively less-powerful processor, the relatively less-powerful processor continues execution of the task. If the task is not relocated, the task remains on the relatively more-powerful processor and is executed by the relatively more-powerful processor.

Figure 8:
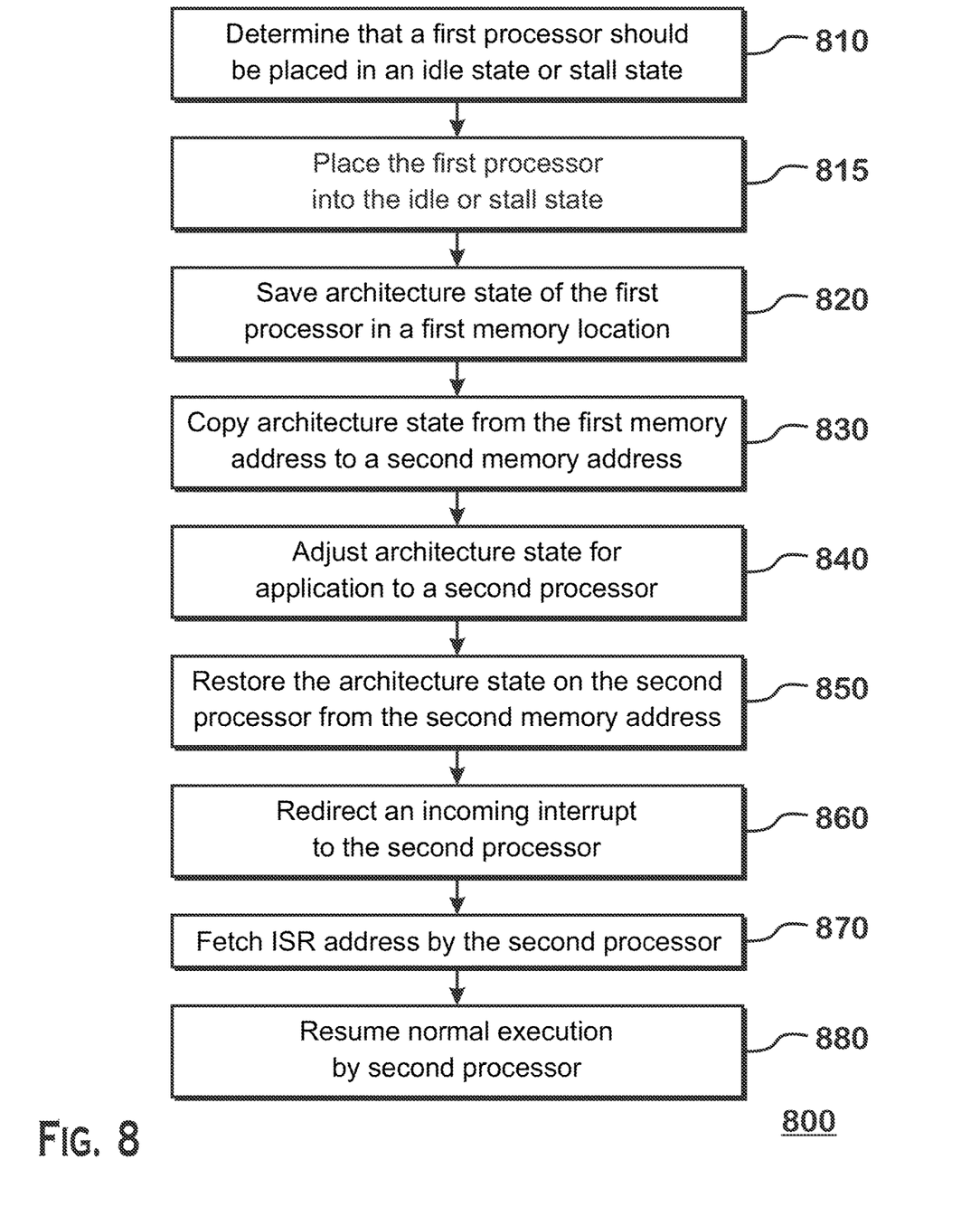
FIG. 8 is a flow chart depicting another example method of relocating one or more tasks from a first processor to a second processor.

FIG. 8 is a flow chart depicting another example method 800 of relocating one or more tasks from a first processor to a second processor. In one example, the first processor is a relatively more-powerful processor and the second processor is a relatively less-powerful processor. In another example, the first processor is a relatively less-powerful processor and the second processor is a relatively more-powerful processor. In yet another example, the two processors are heterogeneous, e.g. a CPU and a GPU.

Method 800 includes, at step 810, determining that the first processor should be placed in an idle state or stall state. Determination that the first processor should be placed in the idle state or stall state is performed in accordance with the description provided above. For example, the first processor is the relatively less-powerful processor and the second processor is the relatively more-powerful processor. Further, in this example, the first processor's core utilization is over its associated threshold. As such, it is determined that one or more tasks should be relocated to the relatively more-powerful processor. In one example, the relatively less-powerful processor is a little, mini, or tiny core. Step 810 may further include starting a power-up process for a second processor while the first processor is still executing. The power-up process for the second processor may include, for example, ramping up a voltage rail, repairing memory, fuse delivery, and core state initialization. In this way, the second processor may be ready to restore architecture state such that execution is switched to the second processor without a blackout. Method 800 further includes, at step 815, placing the first processor into the idle state or stall state. In one example, to stall the relatively less-powerful processor, a micro-architectural method is implemented. In another example, as part of placing the relatively less-powerful processor into a stall state, it is first determined that all micro-operands are retired, in other words, there are no outstanding instructions, no outstanding requests to memory, no internal instruction streams remaining, and there are no instructions in-flight. In some examples, the relatively less-powerful processor is expected to respond to incoming probes to its cache subsystem without taking the relatively less-powerful processor out of the stalled state. In some examples, an interrupt should be blocked from entering the relatively less-powerful processor and thus waits at the boundary.

In another example, the first processor is the relatively more-powerful processor and the second processor is the relatively less-powerful processor. In one example, the more-powerful processor is determined to be, on average, in an idle state more its associated threshold. As such, it is determined that one or more tasks should be relocated to the relatively less-powerful processor and the relatively more-powerful processor is placed, for example, into a c-state. It should be noted, such as describe above, that this relocation can be, for example, between a GPIO/Initial service stage and a little/tiny processor or this relocation may be between the little/tiny processor and a big processor.

The method 800 further includes, at step 820, saving an architecture state of the first processor in a first memory location. In one example, the architecture state is a combination of one or more registers and one or more flags. The first memory location, in some examples, is associated with the first processor. In another example, method 800 includes starting step 815 at a time such that it overlaps with step 810 and finishes as step 820 also finishes to avoid any delays associated with completing step 815.

The method 800 further includes, at step 830, copying the architecture state from the first memory address to a second memory address. The second memory address, in some examples, is associated with the second processor. In some examples, the architecture state is adjusted for the second processor. Optionally, at step 840, this adjustment is performed so that the adjusted architecture state is applied to the second processor. At step 850, the method further includes restoring the architecture state on the second processor from the second memory address. In another example, the memory used for copying the architecture state as in step 830 and restoring the architecture state as in step 850 is dedicated static random access memory (SRAM). In yet another example, in lieu of use of memory in steps 830 and 850, register buses may be bridged between the first processor and the second processor so that the architecture state is moved directly between the processors. At step 860, an incoming interrupt is redirected to the second processor. Although step 860 is depicted in FIG. 8 as following step 850, any incoming interrupt that is received at any point prior to completion of step 850 is stalled, such that at step 860, the interrupt is redirected to the second processor. At step 870, the ISR address of the incoming interrupt is fetched by the second processor and the interrupt is serviced. Following completion of servicing the interrupt, at step 880, normal execution is resumed on the second processor.

Although in some of the examples provided above, a relatively-less powerful processor and a relatively-more powerful processor are described, any two or more heterogeneous processors may be used. For example, tasks from a CPU core are relocated to a GPU core, or vice versa.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, and the SIMD units 138), may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for relocating a task that is performed by a computer, the method comprising:
    executing the task in a microprocessor when the task is able to be serviced by the microprocessor; and in response to the microprocessor not being able to service the task:
  powering down the microprocessor;
  relocating the task from the microprocessor to a relatively less-powerful processor and executing the task on the relatively less-powerful processor;
  monitoring one or more metrics associated with execution of the task by the relatively less-powerful processor;
  comparing at least one metric of the one or more metrics to a threshold; and
  selectively relocating the task from the relatively less-powerful processor to a relatively more-powerful processor and executing the task on the relatively more-powerful processor based on the comparing.

2. The method of claim 1, wherein the at least one metric includes a core utilization metric of the relatively less-powerful processor.

3. The method of claim 2, wherein:
  the core utilization metric includes an indication of a duration of time that the relatively less-powerful processor is running at maximal speed,
  the threshold is an indication of a duration of time threshold, and
  the task is relocated to the relatively more-powerful processor on a condition that the indication of the duration of time that the relatively less-powerful processor is running at maximal speed is greater than the duration of time threshold.

4. The method of claim 1, wherein the at least one metric includes a memory utilization metric associated with the relatively less-powerful processor.

5. The method of claim 4, wherein:
  the memory utilization metric includes an indication of a duration of time that a memory is operating at a maximal memory performance state,
  the threshold is an indication of a duration of time threshold, and
  the task is relocated to the relatively more-powerful processor on a condition that the indication of the duration of time that the relatively less-powerful processor is running at maximal speed is greater than the duration of time threshold.

6. The method of claim 1, wherein the at least one metric of the one or more metrics includes a direct memory access (DMA) data rate.

7. The method of claim 1, further comprising setting the relatively less-powerful processor in a low-power state.

8. The method of claim 1, wherein the relatively less-powerful processor and the relatively more-powerful processor are included in a fabric, wherein the microprocessor uses less power than the relatively less-powerful processor.

9. The method of claim 8, further comprising, in response to the microprocessor not being able to service the task, powering on the fabric from a powered off or low-power state.

10. The method of claim 1, wherein the microprocessor services the task when the task does not require use of x86 instructions.

11. A system comprising:
a microprocessor;
a first processor;
a second processor; and
circuitry configured to:
  execute a task in the microprocessor when the task is able to be serviced by the microprocessor; and
  in response to the microprocessor not being able to service the task:
    power down the microprocessor;
    relocate the task from the microprocessor to the first processor and execute the task on the first processor;
    monitor one or more metrics associated with execution of the task by the first processor;
    compare at least one metric of the one or more metrics to a threshold; and
    selectively relocate the task from the first processor to the second processor and execute the task on the second processor based on the comparing,
  wherein the first processor is a relatively less-powerful processor and the second processor is a relatively more-powerful processor.

12. The system of claim 11, wherein the at least one metric includes a core utilization metric of first processor.

13. The system of claim 12, wherein:
  the core utilization metric includes an indication of a duration of time that the first processor is running at maximal speed,
  the threshold is an indication of a duration of time threshold, and
  the task is relocated to the second processor on a condition that the indication of the duration of time that the first processor is running at maximal speed is greater than the duration of time threshold.

14. The system of claim 11, wherein the at least one metric includes a memory utilization metric associated with the first processor.

15. The system of claim 14, wherein:
  the memory utilization metric includes an indication of a duration of time that a memory is operating at a maximal memory performance state,
  the threshold is an indication of a duration of time threshold, and
  the task is relocated to the second processor on a condition that the indication of the duration of time that the first processor is running at maximal speed is greater than the duration of time threshold.

16. The system of claim 11, wherein the at least one metric of the one or more metrics includes a direct memory access (DMA) data rate.

17. The system of claim 11, wherein the circuitry is further configured to set the relatively less-powerful processor in a low-power state.

18. The system of claim 11, wherein the first processor and the second processor are included in a fabric, wherein the microprocessor uses less power than the first processor.

19. The system of claim 18, wherein the circuitry is further configured to, in response to the microprocessor not being able to service the task, power on the fabric from a powered off or low-power state.

20. The system of claim 11, wherein the microprocessor services the task when the task does not require use of x86 instructions.

* * * * *